United States Patent
Li et al.

(10) Patent No.: US 9,731,227 B2
(45) Date of Patent: Aug. 15, 2017

(54) HOUSEHOLD WATER FILTER ELEMENT FOR REMOVING RADIOACTIVE SUBSTANCES

(71) Applicant: Nano and Advanced Materials Institute Limited, Hong Kong (HK)

(72) Inventors: Jifan Li, Hong Kong (HK); Yee Man Ho, Hong Kong (HK); Ka Chun Lee, Hong Kong (HK); Wai Yan Chan, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 246 days.

(21) Appl. No.: 14/501,058

(22) Filed: Sep. 30, 2014

(65) Prior Publication Data

US 2015/0101980 A1 Apr. 16, 2015

Related U.S. Application Data

(60) Provisional application No. 61/961,289, filed on Oct. 10, 2013.

(51) Int. Cl.
| | |
|---|---|
| *C02F 1/28* | (2006.01) |
| *C02F 1/42* | (2006.01) |
| *B01D 24/00* | (2006.01) |
| *C02F 101/00* | (2006.01) |
| *C02F 101/12* | (2006.01) |
| *C02F 101/32* | (2006.01) |
| *C02F 101/20* | (2006.01) |

(52) U.S. Cl.
CPC ............ *B01D 24/001* (2013.01); *C02F 1/288* (2013.01); *C02F 1/281* (2013.01); *C02F 1/283* (2013.01); *C02F 1/286* (2013.01); *C02F 1/42* (2013.01); *C02F 2001/422* (2013.01); *C02F 2001/425* (2013.01); *C02F 2001/427* (2013.01); *C02F 2101/006* (2013.01); *C02F 2101/12* (2013.01); *C02F 2101/20* (2013.01); *C02F 2101/322* (2013.01); *C02F 2303/04* (2013.01)

(58) Field of Classification Search
CPC .......... C02F 1/003; C02F 1/281; C02F 1/283; C02F 1/286; C02F 1/288; C02F 1/42; C02F 1/50; C02F 1/62; C02F 2001/422; C02F 2001/425; C02F 2001/427; C02F 2101/006; C02F 2101/12; C02F 2101/20; C02F 2101/322; C02F 2303/04; B01D 24/001; B01D 24/02; B01J 20/0229; B01J 20/20; B01J 20/24; B01J 39/07; B01J 41/07; B01J 47/04

See application file for complete search history.

(56) References Cited

U.S. PATENT DOCUMENTS

| | | | |
|---|---|---|---|
| 8,222,475 B2 | 7/2012 | Denton | |
| 2002/0070172 A1* | 6/2002 | Schlegel | B01D 53/02 210/660 |
| 2002/0193453 A1* | 12/2002 | Bohling | B01J 39/20 521/26 |
| 2005/0038130 A1* | 2/2005 | Podszun | B01J 20/06 521/25 |
| 2010/0176044 A1* | 7/2010 | Domb | B01J 20/0229 210/205 |

FOREIGN PATENT DOCUMENTS

| | | | |
|---|---|---|---|
| CN | 101720306 A | 6/2010 | |
| CN | 102153183 A | 8/2011 | |
| IN | WO 2011151725 A2 * | 12/2011 | B01J 21/04 |
| WO | 2004004935 A1 | 1/2004 | |

OTHER PUBLICATIONS

First Office Action with Search Report of CN201410528222.0 issued by the State Intellectual Property Office of China on Dec. 2, 2015.

* cited by examiner

*Primary Examiner* — Matthew O Savage
(74) *Attorney, Agent, or Firm* — Spruson & Ferguson (Hong Kong) Limited

(57) ABSTRACT

The present invention relates to a filter element for disinfecting, cleaning and purifying household water, by removing pollutants such as heavy metals, bacteria, VOCs, and even radioactive substance. The present filter element comprises activated carbon, ion exchange resins (cationic and anionic), biopolymer and transitional metal oxide. Said biopolymer and transitional metal oxide are both in particle form and said transitional metal oxide particle can be either incorporated into the biopolymer particle or directly incorporated into the present filter element as individual particle. Maximum capacity of the present filter element can reach up to 150 L of household water. Some of the pollutants can be removed by up to 99% by the present filter element. A method of preparing the present filter element is also disclosed herein.

11 Claims, 3 Drawing Sheets

HOUSEHOLD WATER FILTER ELEMENT FOR REMOVING RADIOACTIVE SUBSTANCES

CROSS REFERENCE TO RELATED APPLICATIONS

The present application claims priority of U.S. provisional patent application Ser. No. 61/961,289 filed Oct. 10, 2013, and the disclosure of which is incorporated herein by reference in its entirety.

FIELD OF THE INVENTION

The present invention relates to a filter element for disinfecting, cleaning and purifying water. The invention is of particular interest in the field of the drinking water treatment.

BACKGROUND OF THE INVENTION

Clean drinking water is the basic human need. However, over 1 billion people lack access to safe drinking water worldwide. In addition, The Great East Japan Earthquake occurred on 11 Mar. 2011 caused an explosion at the Tokyo Electric Power Company (TEPCO) Fukushima Daiichi Nuclear Power Plant, which resulted in the release of large amounts of radionuclides into the environment (Water Supply Division (WSD), Health Service Bureau (HSB), Ministry of Health, Labour, and Welfare (MHLW), 2011). Radioactive iodine ($^{131}I$) and cesium ($^{134}Cs$ and $^{137}Cs$) have already detected in drinking water after the explosion. Thus, it has brought the great concerns to the safety of drinking water. Conventional water filter element for water pitcher on the market is usually composed of activated carbon and ion exchange resin, which can only remove heavy metals and VOCs from water. Due to the high risk of water contaminated with the radioactive substances after Great East Japan Earthquake occurred on 11 Mar. 2011, several research groups have started investigating to use the conventional water filter element to remove the radioactive substances from the contaminated water.

SUMMARY OF THE INVENTION

This invention relates to a filter element for disinfecting, cleaning, and purifying household water, which can effectively remove not only the radioactive substances but also the heavy metals, VOCs, and bacteria from water. The presently claimed filter element comprises biopolymer particles, transition metal hydroxide or oxide particles, and some conventional filter elements such as activated carbon and ion exchange resin. The incorporated biopolymer particles are polysaccharides including but not limited to cellulose, starch, carrageenan, chitosan, chitin and alginate, or a mixture thereof, which makes the presently claimed filter element to have the antibacterial and coagulation properties due to their positive or negative surface charges. Coagulation described herein refers to ability to attract substances with opposite charge. These biopolymers are abundant, economic, and non-toxic, which make them a good candidate for the water filter element. Transition metal hydroxide or oxide materials have been widely used in environmental monitoring, remediation and pollution prevention in view of their low cost, natural abundance, and environment-friendly properties. The special properties of these nanomized transitional metal hydroxide or oxide materials are originated from the rich valence states, vast surface area and variable electronic structures. One example, iron oxide nanomaterials, has been demonstrated to remove toxic heavy metal ions and organic pollutants from waste water successfully. Thus, the transition metal oxide nanoparticles, which have the extreme high absorption capacity on the heavy metals and VOCs, are also included in the filter element of the present invention to enhance its performance on water purification.

Accordingly, in the first aspect of the present invention, it is provided that a filter medium comprising said biopolymer, transition metal hydroxide or oxide, activated carbon and ion exchange resin. The ion exchange resin includes cationic and anionic ion exchange resins. The ion exchange resins include strong acidic resin (e.g., sodium polystyrene sulfonate or polyAMPS), weak acidic resin (polyacrylic polymer with carboxylic acid groups), strong basic resin [e.g., poly (acrylamido-N-propyltrimethylammonium chloride)], weak basic resin (e.g. polyethylene amine), or a mixture of these resins. The biopolymer is in particle form and includes one or more than one biopolymer which becomes water insoluble through crosslinking. The size of the biopolymer particle ranges from 1 μm to 100 μm. Examples of the crosslinked biopolymer include chitosan and alginate. One example of the crosslinker used herein to crosslink the biopolymer is calcium compound. The transition metal hydroxide or oxide includes hydroxy iron oxide ($\alpha$-FeOOH), iron oxide, and copper oxide. The transition metal hydroxide or oxide is also in particle form which is nanomized ranging from 10 nm to 10 μm and has a three-dimensional (3D) hierarchically structure such as flakes, spheres, and flower. These transition metal hydroxide or oxide particles can be incorporated into the biopolymer particles through in-situ process to form a biopolymer-metal oxide particle, and/or can be added into the filter element directly as individual particles. A preferred embodiment of the biopolymer-metal oxide particle is chitosan/hydroxy iron oxides/alginate (CHA) particles. In one embodiment, the weight ratio of activated carbon:cationic ion exchange resin:anionic ion exchange resin:chitosan/hydroxy iron oxides/alginate (CHA) particles in the presently claimed filter element is 0-30: 35-45: 15-20: 15-20. In another embodiment, the weight ratio of activated carbon:cationic ion exchange resin:anionic ion exchange resin:chitosan/hydroxy iron oxides/alginate (CHA) particles is 25:41:17: 17. Other than the transitional metal hydroxide or oxide, the filter element can also include metals such as silver, zinc and copper as an antimicrobial agent.

The second aspect of the present invention relates to a method of preparing the filter element as described herein. In an exemplary embodiment, the method includes the following steps:

(a) preparing hydroxy iron oxide nanoparticles;
(b) incorporating said hydroxy iron oxide nanoparticles obtained from (a) into a first mixture of chitosan and alginate and then stirring thereof until a plurality of chitosan/hydroxy iron oxide/alginate (CHA) particles is formed;
(c) mixing said CHA particles obtained from (b) with activated carbon, ion exchange resins to form a second mixture;
(d) adding said second mixture obtained from (c) into a filter housing to form the filter element;
(e) washing said filter element with deionized water until filtrate becomes clear.

In one embodiment, the hydroxy iron oxide nanoparticles to be incorporated into the chitosan/alginate mixture to form the CHA particles is prepared by dissolving iron (II) sulphate ($FeSO_4.H_2O$) into a mixture of $H_2O$ and glycerol in a volume ratio of 7:1 and stirring the mixture for at least 10 minutes, followed by transferring the mixture into an autoclave to heat up at about 120° C. for 24 hours, collecting precipitate formed after heating overnight, washing said precipitate with another mixture of $H_2O$ and glycerol, and drying the washed precipitate at 60° C.; hydroxy iron oxide nanoparticles are formed after said drying.

In another embodiment, the incorporation of the hydroxy iron oxide nanoparticles into the chitosan/alginate mixture to form the CHA particles comprises mixing said hydroxy iron oxide nanoparticles in the first mixture of chitosan at 2 wt. % and sodium alginate at 0.5 wt. %, followed by adding said mixture drop by drop into 0.5 wt. % of calcium chloride under stirring until the CHA particles are formed.

DETAILED DESCRIPTION OF THE INVENTION

Figure 1:
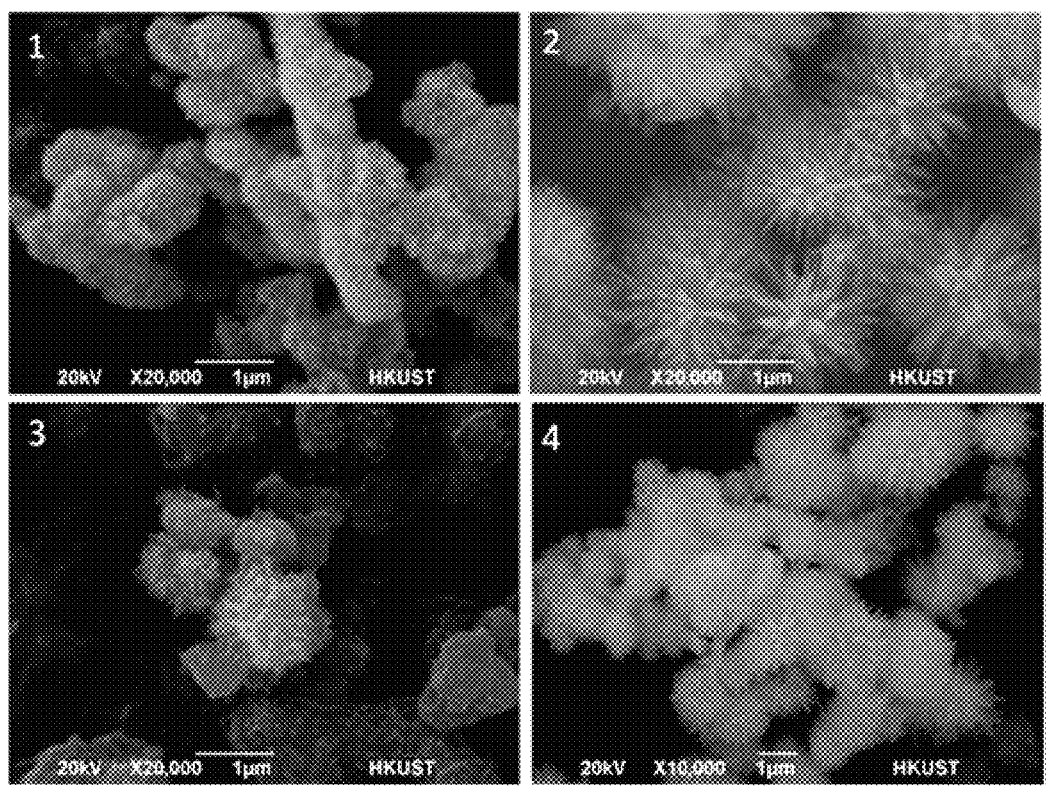
FIG. 1 shows SEM images of hydroxy iron oxide ($\alpha$-FeOOH) particles flower-like or clamps of flower-like 3-D structure.

The phrase "hydroxyl iron oxide/oxides" used herein may refer to "Goethite" which is commonly used in the art with the chemical formula of $\alpha$-FeOOH.

Reference will now be made in detail to the presently preferred embodiment of the present invention, serve to explain the principles of the invention. These embodiments or examples are described in sufficient detail to enable those skilled in the art to practice the invention, and it is to be understood that other embodiments may be utilized, and that changes may be made without departing from the spirit of the present invention.

EXAMPLES

Example 1

Comparison in Removal Percentage of Various Pollutants Between Conventional Filter and Present Filter In this example, the presently claimed filter in the weight of 90 g is configured to include the following components and weight ratio: activated carbon (AC):cationic ion exchange resin (IES):anionic ion exchange resin (IES):chitosan/hydroxy iron oxides/alginate (CHA) particles=25:41:17:17. For comparison, a commercial water filter also in the weight of 90 g is used, which includes activated carbon (AC):ion exchange resin (IES) in a weight ratio of 25:75. 150 L water containing different pollutants is filtered through both filters. The initial concentration of different pollutants in the filtrate is listed in Table 1.

TABLE 1

| Pollutants | Concentration |
| --- | --- |
| Chlorine | 0.34 mg/L |
| Iodine | 0.213 mg/L |
| Benzene | 47 µg/L |
| Toluene | 49 µg/L |
| Ethylbenzene | 44 µg/L |
| Copper | 46 µg/L |
| Cadmium | 23 µg/L |
| Mercury | 5.2 µg/L |
| Zinc | 40 µg/L |
| Lead | 41 µg/L |
| E. coli | $1 \times 10^5$/L |

Removal percentage of different elements or agents by the present filter and the convention filter in this example is shown in Table 2.

TABLE 2

| | | Present Filter | Conventional Filter |
| --- | --- | --- | --- |
| Heavy Metal | Cd | 99% | 96% |
| | Pb | 95% | 88% |
| | Hg | 94% | 95% |
| | Zn | 86% | 91% |
| | Cu | 98% | 95% |
| Halogen | Cl | >85% | >83% |
| VOC | Benzene | >89% | 89% |
| | Toluene | >89% | >90% |
| | Ethylbenzene | 86% | 87% |
| Bacteria | E. Coli | 96% | 78% |
| Radioactive substances | Ba isotope | 42% | 37% |
| | Sr isotope | 38% | 36% |
| | I isotope | >53% | 3% |

The present filter element has very high removal rate on heavy metals, VOCs, radioactive substances, and bacterium. Also, the pH of the effluent is not affected by the filter element. In this example, the maximum capacity of the present filter is 40 gallons (~150 L) and no clogging or significantly slow flow rate is observed during filtering such volume of water.

Example 2

Comparison in Removal Percentage of Pollutants by Present Filter with Different Weight Ratio of Filtering Components

| | |
| --- | --- |
| Cd | 2.4 |
| Cu | 3.4 |
| Pb | 3.1 |
| Zn | 17.3 |
| Hg | 1.6 |
| Ba isotope | 2.8 |
| Sr isotope | 1.6 |

Removal percentage of different heavy metals or radioactive substances by the filter with different weight ratio of filtering components is shown in Table 4.

TABLE 4

| | AC:Cationic IES:Anionic IES:Chitosan/ hydroxy iron oxides/alginate (CHA) particles = 25:41:17:17 | AC:Cationic IES:Anionic IES:Chitosan/ alginate (CA) particles = 25:41:17:17 | AC:Cationic IES:Anionic IES = 25:41:34 |
| --- | --- | --- | --- |
| Zn | 84% | 83% | 63% |
| Cd | 78% | 74% | 42% |

TABLE 4-continued

|   | AC:Cationic IES:Anionic IES:Chitosan/ hydroxy iron oxides/alginate (CHA) particles = 25:41:17:17 | AC:Cationic IES:Anionic IES:Chitosan/ alginate (CA) particles = 25:41:17:17 | AC:Cationic IES:Anionic IES = 25:41:34 |
|---|---|---|---|
| Cu | 93% | 84% | 60% |
| Pb | 99% | 94% | 72% |
| Hg | 50% | 48% | 25% |
| Sr isotope | 65% | 60% | 40% |
| Ba isotope | 67% | 60% | 45% |

From Table 4, the filter incorporated with the chitosan/hydroxy iron oxides/alginate (CHA) particles has the highest removal percentage of the tested heavy metals or radioactive substances among the three samples in this example. The filter incorporated with the activated carbon and ion exchange resins only has the lowest removal percentage, about two-third to half of the removal percentage of the filter with the CHA particles. In this example, the filter with the CHA particles can effectively remove 1.5 L of tap water within 3 minutes.

Figure 2:
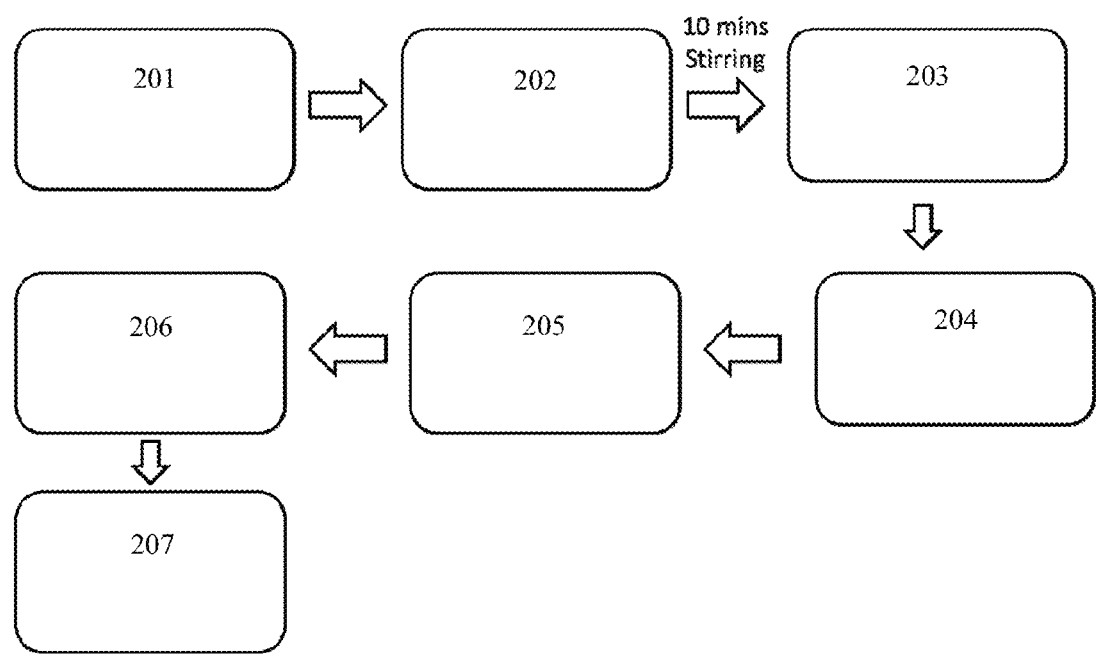
FIG. 2 is a flow chart depicting fabrication process of hydroxy iron oxide ($\alpha$-FeOOH) particles.

FIG. 2 illustrates how the hydroxy iron oxide ($\alpha$-FeOOH) particles are fabricated for being incorporated into the filter element of the present invention. A mixture of $H_2O$/glycerol is first prepared (201). The volume ratio of $H_2O$/glycerol is 7:1. In an embodiment, a mixture containing 35 mL $H_2O$ and 5mL glycerol is prepared. Once the mixture of $H_2O$/glycerol is formed, iron (II) sulphate ($FeSO_4 \cdot H_2O$) is dissolved into the mixture (202). In one embodiment, 0.111 g of $FeSO_4 \cdot H_2O$ is dissolved into the mixture obtained from 201. After addition of $FeSO_4 \cdot H_2O$, the mixture is stirred for about 10 minutes. The mixture after stirring is then transferred into a 50 mL autoclave (203). The mixture is heated at 120° C. for 24 hours (204). The precipitate formed from 204 is collected which is $\alpha$-FeOOH precipitate. The collected $\alpha$-FeOOH precipitate is then washed with $H_2O$/glycerol (205). After being washed with $H_2O$/glycerol, the $\alpha$-FeOOH precipitate is dried at 60° C. for about an hour (206). After drying, the hydroxy iron oxide in particle form is formed and ready for use/further processing (207).

Figure 3:
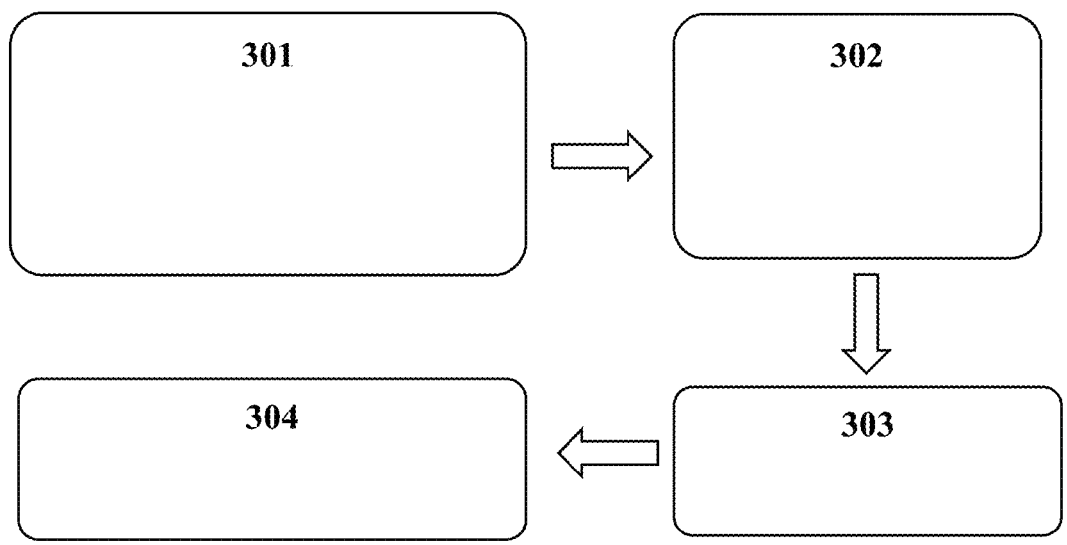
FIG. 3 is a flow chart depicting fabrication process of the present filter element according to an embodiment of the present invention.

FIG. 3 illustrates how the hydroxy iron oxide ($\alpha$-FeOOH) nanoparticles of the present invention are incorporated into the chitosan-alginate particle and mixed with other components to form the filter element of the present invention. 100 mg of the prepared hydroxy iron oxide ($\alpha$-FeOOH) nanoparticles according to the embodiment illustrated in FIG. 3 are mixed in 2 wt. % of chitosan solution with 0.5 wt. % sodium alginate solution together, followed by adding the mixture drop by drop under stirring into 0.5 wt. % calcium chloride (301). Activated carbon, ion exchange resins, and hydroxy iron oxide nanoparticles incorporated into chitosan-alginate particles (CHA particles) are mixed together at a desired weight ratio (302). The desired weight ratio according to Example 2 is 25:41:17:17 for activated carbon: cationic ion exchange resins:anionic ion exchange resins: CHA particles. After the mixture of activated carbon, cationic and anionic ion exchange resins, and CHA particles is thoroughly mixed to form the filter elements, the filter elements are added into a filter housing (303). The filter housing can be a filtering column, cylindrical container, or container in other shape. The filter elements are then washed with deionized water until the filtrate becomes clear (304). The filter elements after that are ready for use.

INDUSTRIAL APPLICABILITY

The present filter element is useful in making drinking water filter for removing various pollutants including certain radioactive substances. The present filter element can be used at household level or even be scaled up to industrial level if necessary.

It is understood that the method described herein may be performed in different order, concurrently and/or together with other steps not mentioned herein but readily appreciated by one skilled in the art to obtain the filter medium of the present invention. Without further elaboration, it is believed that one skilled in the art can, based on the description herein, modify the present invention without departing the spirit of the present invention and utilize the present invention to its fullest extend. All publication recited herein are hereby incorporated by reference in their entirety.

What is claimed is:

1. A filter element for disinfecting, cleaning and purifying household water comprising activated carbon, ion exchange resins, biopolymer, and metal oxide; said ion exchange resins including cationic and anionic ion exchange resins; said biopolymer being in particle form ranging from 1 μm to 100 μm; said metal oxide also being in particle form ranging from 10nm to 10 μm and incorporated into said biopolymer particle through in-situ process to form a biopolymer-metal oxide particle; said activated carbon, cationic ion exchange resins, anionic ion exchange resins, and the biopolymer-metal oxide particle having a weight ratio of 25:41:17:17 in said filter element and at said weight ratio the filter element having a maximum capacity of about 150 L household water to be filtered,
   wherein said metal oxide is hydroxy iron oxide ($\alpha$-FeOOH) and said biopolymer-metal oxide particle is chitosan/hydroxy iron oxides/alginate (CHA) particle.

2. The filter element of claim 1, wherein pollutants to be removed from the water by said filter element comprise heavy metals, volatile organic compounds (VOCs), halogen, bacteria and radioactive substances.

3. The filter element of claim 2, wherein said heavy metals comprise cadmium, lead, silver, zinc, and copper.

4. The filter element of claim 2, wherein said VOCs comprise benzene, toluene, and ethylbenzene.

5. The filter element of claim 2, wherein said halogen comprises chlorine.

6. The filter element of claim 2, wherein said bacteria comprises *E. coli*.

7. The filter element of claim 2, wherein said radioactive substances comprise radioactive barium, strontium, and iodine.

8. A household water filtering system comprising the filter element of claim 1.

9. A method of preparing the filter element of claim 1, said method comprising:
   (a) preparing hydroxy iron oxide ($\alpha$-FeOOH) nanoparticles;
   (b) incorporating said $\alpha$-FeOOH nanoparticles obtained from (a) into a first mixture of chitosan and alginate and then stirring thereof until a plurality of chitosan/hydroxy iron oxide/alginate (CHA) particles is formed;
   (c) mixing said CHA particles obtained from (b) with activated carbon, ion exchange resins to form a second mixture;
   (d) adding said second mixture obtained from (c) into a filter housing to form the filter element;

(e) washing said filter element with deionized water until filtrate becomes clear.

10. The method of claim 9, wherein said preparing in (a) comprises dissolving iron (II) sulphate ($FeSO_4 \cdot H_2O$) into a mixture of $H_2O$ and glycerol in a volume ratio of 7:1 and stirring the mixture for at least 10 minutes, followed by transferring the mixture into an autoclave to heat up at about 120° C. for 24 hours, collecting precipitate formed after heating overnight, washing said precipitate with another mixture of $H_2O$ and glycerol, and drying the washed precipitate at 60° C. for about an hour; hydroxy iron oxide nanoparticles are formed after said drying.

11. The method of claim 9, wherein said incorporating in (b) comprises mixing said hydroxy iron oxide nanopartieles in the first mixture of chitosan at 2 wt. % and sodium alginate at 0.5 wt. %, followed by adding said mixture drop by drop into 0.5 wt. % of calcium chloride under stirring until the CHA particles are formed.

* * * * *